United States Patent
Huang et al.

(10) Patent No.: US 12,384,073 B2
(45) Date of Patent: Aug. 12, 2025

(54) METHOD FOR PREPARING SHELL-BIONIC CERAMIC TOOL AND SHELL-BIONIC CERAMIC TOOL

(71) Applicants: SHANDONG UNIVERSITY, Shandong (CN); YANSHAN UNIVERSITY, Hebei (CN)

(72) Inventors: Chuanzhen Huang, Qinhuangdao (CN); Yunpeng Feng, Jinan (CN); Hanlian Liu, Jinan (CN); Zhenyu Shi, Jinan (CN); Peng Yao, Jinan (CN); Dun Liu, Jinan (CN); Bin Zou, Jinan (CN); Hongtao Zhu, Jinan (CN); Zhen Wang, Qinhuangdao (CN); Jun Wang, Qinhuangdao (CN); Longhua Xu, Qinhuangdao (CN); Shuiquan Huang, Qinhuangdao (CN); Meina Qu, Qinhuangdao (CN); Zhengkai Xu, Qinhuangdao (CN); Minting Wang, Qinhuangdao (CN); Yabin Guan, Qinhuangdao (CN)

(73) Assignees: SHANDONG UNIVERSITY, Shandong (CN); YANSHAN UNIVERSITY, Hebei (CN)

( * ) Notice: Subject to any disclaimer, the term of this patent is extended or adjusted under 35 U.S.C. 154(b) by 232 days.

(21) Appl. No.: 18/168,798

(22) Filed: Feb. 14, 2023

(65) Prior Publication Data
US 2024/0131746 A1    Apr. 25, 2024
US 2024/0227235 A9    Jul. 11, 2024

(30) Foreign Application Priority Data
Oct. 25, 2022    (CN) .......................... 202211309618.7

(51) Int. Cl.
B28B 3/02    (2006.01)
C04B 35/117    (2006.01)
(Continued)

(52) U.S. Cl.
CPC ............ B28B 3/021 (2013.01); C04B 35/117 (2013.01); C04B 35/6261 (2013.01);
(Continued)

(58) Field of Classification Search
None
See application file for complete search history.

(56) References Cited

U.S. PATENT DOCUMENTS
2002/0054794 A1    5/2002  Kato et al.

FOREIGN PATENT DOCUMENTS
CN    1477081 A      2/2004
CN    106187121 A    12/2016
CN    112521132 A    3/2021

OTHER PUBLICATIONS
Machine translation of CN112521132.*
(Continued)

*Primary Examiner* — Christopher T Schatz
(74) *Attorney, Agent, or Firm* — Oliff PLC

(57) ABSTRACT

A method for preparing a shell-bionic ceramic tool and a shell-bionic ceramic tool, wherein the shell-bionic ceramic tool includes alternating stacks of ceramic powders with different components, pressing a ceramic green body using a cold briquetting method, carrying out pre-pressing once using a graphite indenter on a working surface thereof after each layer of the ceramic powder being loaded, and pressing a last layer using a graphite rod, and then pressing a whole ceramic green body with a certain pressure to promote a bonding of the layers of ceramic powder, which in turn gives a complex shape to an interface between the layers,
(Continued)

increases a bonding area between the layers, and plays the role of hindering crack expansion, extending the crack expansion path, and improving the bonding strength of the interface; after then, hot-pressed sintering is used to densify the ceramic green body to obtain the shell-bionic ceramic tool.

6 Claims, 4 Drawing Sheets

(51) Int. Cl.
    *C04B 35/626*     (2006.01)
    *C04B 35/63*     (2006.01)
    *C04B 35/645*     (2006.01)

(52) U.S. Cl.
    CPC .... *C04B 35/6264* (2013.01); *C04B 35/62655* (2013.01); *C04B 35/6303* (2013.01); *C04B 35/645* (2013.01); *C04B 2235/3206* (2013.01); *C04B 2235/3217* (2013.01); *C04B 2235/3225* (2013.01); *C04B 2235/3843* (2013.01); *C04B 2235/3847* (2013.01); *C04B 2235/404* (2013.01); *C04B 2235/405* (2013.01); *C04B 2235/604* (2013.01); *C04B 2235/606* (2013.01); *C04B 2235/75* (2013.01)

(56) References Cited

OTHER PUBLICATIONS

Jan. 20, 2023 Office Action issued in Chinese Patent Application No. 202211309618.7.

Xu, Chonghai et al., "An Advanced Ceramic Tool Material", Tool Engineering, vol. 34, No. 10, pp. 6-7.

* cited by examiner

METHOD FOR PREPARING SHELL-BIONIC CERAMIC TOOL AND SHELL-BIONIC CERAMIC TOOL

CROSS-REFERENCES TO RELATED APPLICATIONS

This application claims priority benefits to Chinese Patent Application No. 202211309618.7, filed 25 Oct. 2022, the contents of which are incorporated herein by reference.

TECHNICAL FIELD

The present invention discloses a shell-bionic ceramic tool with complex interfacial shape prepared by a hot-pressed sintering process and a preparation method thereof.

BACKGROUND

The statements in this section merely provide background technical information related to the present invention and do not necessarily constitute prior art.

Ceramic tools have high hardness and high wear resistance, but their inherent brittleness can lead to catastrophic breakage during work, which seriously affects the reliability of work. Research has shown that the special structure of the shell of shellfish substantially increases the strength of the shell, achieving a combination of high strength and high toughness, and applying this structure to ceramic tools can improve the toughness and service life of ceramic tools.

At present, the common preparation methods of bionic ceramic tools are a pressureless sintering, a hot-pressed sintering and a spark plasma sintering, etc. The molding methods of each layer are mainly molding by tape casting process, molding by slip casting process and molding by tape rolling process. However, the density of the materials prepared by pressureless sintering is lower and the preparation period thereof is longer, and the cost of spark plasma sintering is high. In addition, the tape casting process is complex; the density of the material obtained by the slip casting process is generally low; and the ceramic green body obtained by the tape rolling process is thicker, and the processing steps thereof are numerous and the operation is complex.

The CN112521132A disclosed a method for preparing a bionic ceramic tool and a bionic ceramic tool, wherein the bionic ceramic tool consists of alternating layers of hard-layer materials and soft-layer materials, which is characterized by that, during loading materials, carrying out a pre-press one time using a non-linear indenter die after laying one layer of the hard-layer material or the soft-layer material, wherein the different layers are pre-pressed using the different or the same non-linear indenter dies, and the last layer is pre-pressed using a indenter die with linear cross-section, so that an interface of the transition zone between the heterogeneous layers has different textures; the hard-layer material is a composite powder composed of $Al_2O_3$, $Si_3N_4$, Ti(C,N), and $Y_2O_3$; the soft-layer material is a composite powder composed of $Al_2O_3$, $SiC_w$, and Ni; however, there are the following problems: firstly, during the molding stage, because the working face of the indenter die in use is obviously directional, it is difficult to keep the working face in the same direction when every time the indenter die performs the pre-press, which will lead to uneven mechanical properties and poor repeatability of the prepared materials; in addition, after grinding and polishing processes, the direction of the interface shape of the sample is difficult to be confirmed, and in the subsequent treatment stage of the sample, especially when cutting the sample to prepare the tool, it is required to cut in a direction perpendicular to the interface shape, which is difficult in practice; finally, because the pressed interface is directional, it will lead to anisotropy in the mechanical properties of the material perpendicular to the lamination direction.

SUMMARY

In view to the shortcomings of the prior art, it is an objective of the present invention to provide a shell-bionic ceramic tool with complex interface shape prepared by a hot-pressed sintering process, which is prepared by the hot-pressed sintering process, and the ceramic tool has uniform grain size and high density; meanwhile, with reference to the microstructure with interlaced layers and uneven interface of shell nacres, the fracture toughness and flexural strength of the ceramic tool are improved, and the working reliability of the ceramic tool is improved. A working surface of the indenter die used is basically symmetrical, and the working surface is more complex, so that the layers bite each other, simulating the structure of mineral bridges in the shell nacre. There is no need to consider the direction of the working surface used during the molding and sample processing, which reduces the difficulty of preparing the shell-bionic ceramic tool and not only improves the mechanical properties of the material, but also ensures the uniformity of the mechanical properties of the material and avoids anisotropy of the mechanical properties in the direction perpendicular to the stacked layers. In addition, the microstructure of the ceramic tool can be adjusted during the preparation process to achieve controllable mechanical properties.

To achieve the above purpose, the present invention uses the following technical solutions.

It is a first aspect of the present invention to provide a method for preparing a shell-bionic ceramic tool, wherein the shell-bionic ceramic tool comprises alternating stacks of ceramic powders with different components, and during a cold briquetting, carrying out pre-pressing once using a graphite indenter with a spiral linear bulge or multiple concentric circular bulges on a working surface thereof after each layer of the ceramic powder being loaded, and pressing a last layer using a graphite rod, and then pressing a whole ceramic green body with a certain pressure to promote a bonding of the layers of ceramic powder, which in turn gives a complex shape to an interface between the layers, increases a bonding area between the layers, and plays the role of hindering crack expansion, extending the crack expansion path, and improving the bonding strength of the interface.

As a further technical solution, the ceramic powders with different components are as follows:

A matrix layer ceramic powder is a composite powder comprising $Al_2O_3$, (W, Ti) C, MgO, and $Y_2O_3$, and an interlayer ceramic powder is a composite powder comprising $Al_2O_3$, TiC, Ni, Mo, MgO, and $Y_2O_3$.

As a further technical solution, a method for preparing the matrix layer ceramic powder is as follows:

carrying out a high-speed ball-milling on weighed composite powder of submicron $Al_2O_3$, (W, Ti)C, MgO, and $Y_2O_3$ with anhydrous ethanol as a dispersion medium for 72 h, to make the composite powder be mixed uniformly; placing the composite powder of submicron $Al_2O_3$, (W, Ti)C, MgO, and $Y_2O_3$ after the ball-milling in a vacuum drying oven for drying, and after drying, sieving the dried composite powder, and packaging for standby.

As a further technical solution, a method for preparing the interlayer ceramic powder is as follows:

carrying out the high-speed ball-milling on weighed composite powder of submicron $Al_2O_3$, TiC, Ni, Mo, MgO, and $Y_2O_3$ with anhydrous ethanol as a dispersion medium for 72 h, to make the composite powder be mixed uniformly; placing the composite powder after the ball-milling in a vacuum drying oven for drying, and after drying, sieving the dried composite powder, and packaging for standby.

As a further technical solution, a process of the cold briquetting is as follows:

weighting and loading the prepared matrix layer ceramic powder into a graphite sleeve with a lower part thereof closed by a graphite bedding block, then pre-pressing the powder using the graphite indenter with the spiral linear bulge or multiple concentric circular bulges on the working surface thereof, then loading the prepared interlayer ceramic powder into the graphite sleeve, and then pre-pressing the powder using the graphite indenter with the spiral linear bulge or multiple concentric circular bulges on the working surface thereof, laying the layers alternately in turn, and carrying out the pre-pressing using the graphite indenter with the spiral linear bulge or multiple concentric circular bulges on the working surface thereof after each the layer being loaded, and pressing a last layer using a graphite rod, and then pressing a whole ceramic green body with a certain pressure to promote a bonding of the layers of ceramic powder, which in turn gives a complex shape to an interface between the layers.

As a further technical solution, after the cold briquetting is completed, removing the graphite rod, and inserting a graphite bedding block on a top of the ceramic green body and compacting, and then sealing the graphite sleeve with the graphite rod and placing the whole in a hot-pressed sintering furnace for sintering and densification; after the sintering is completed and being cooled to room temperature, taking out the sample obtained after sintering, carrying out processes such as grinding, polishing and cutting on the sample to complete the preparation of the shell-bionic ceramic tool.

As a further technical solution, the graphite indenter used is not limited to one shape, and the working surface thereof can be made into other complex shapes, and different shapes of graphite indenter can be used in combination to obtain shell-bionic ceramic tools with different interface shape combinations.

It is a second aspect of the present invention to provide a shell-bionic ceramic tool, which is prepared by the method described above.

The beneficial effects of the present invention described above are as follows:

According to the present invention, the shell-bionic ceramic tool is prepared by a hot-pressed sintering process, the ceramic tool has uniform grain size and high density; meanwhile, with reference to the microstructure with interlaced layers and uneven interface of shell nacres, the fracture toughness and flexural strength of the ceramic tool are improved, and the working reliability of the ceramic tool is improved. A working surface of the indenter die used is basically symmetrical, and the working surface is more complex, so that the layers bite each other, simulating the structure of mineral bridges in the shell nacre, and diffusion and penetration occur at the interface bonding, which increases the interface bonding strength. There is no need to consider the direction of the working surface used during the molding and sample processing, which reduces the difficulty of preparing the shell-bionic ceramic tool and not only improves the mechanical properties of the material, but also ensures the uniformity of the mechanical properties of the material and avoids anisotropy of the mechanical properties in the direction perpendicular to the stacked layers. Through the actual mechanical property test, the mechanical properties of the material are evenly distributed, and there is no anisotropy in the direction perpendicular to the lamination. Due to the introduction of the uneven interfaces, the bonding area of the layers is further increased, and a certain degree of diffusion and penetration occurred at the interface bonding, which improved the strength of the material, and the mechanisms of crack deflection, bifurcation, bridging and interfacial debonding appeared at fracture promoted the improvement of the fracture toughness of the material. In addition, the microstructure of the ceramic tool can be adjusted during the preparation process to achieve controllable mechanical properties.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

For easy understanding, the dimensions of the structure shown in figures are enlarged, and the figures are only used for illustration.

1—Graphite sleeve; 2—Graphite indenter with complex shape; 3—Ceramic green body during pressing; 4—Graphite bedding block; 5—Graphite rod; 6—Ceramic green body after completing the pressing.

DETAILED DESCRIPTION

It should be pointed out that the following detailed descriptions are all illustrative and are intended to provide further descriptions of the present invention. The examples described are only a part examples of the present invention not all the examples. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. In addition, it should further be understood that, terms "comprise" and/or "comprising" used in this specification indicate that there are features, steps, operations, devices, components, and/or combinations thereof.

As introduced in the background, in the existing technology, ceramic tools have the advantages of high hardness, high wear resistance, etc., but they have greater brittleness and low fracture toughness; meanwhile, the density of materials prepared by pressureless sintering is low and the preparation period thereof is long, and the cost of the spark plasma sintering is high; in addition, the tape casting process is complex; the density of materials obtained by slip casting process is generally low; and, the ceramic green body obtained by tape rolling process is thick, and the processing steps thereof are various and the operation is complex. To solve the above technical problems, the present invention proposes a shell-bionic ceramic tool with complex interface shape prepared by a hot-pressed sintering process.

Example

Figure 1:
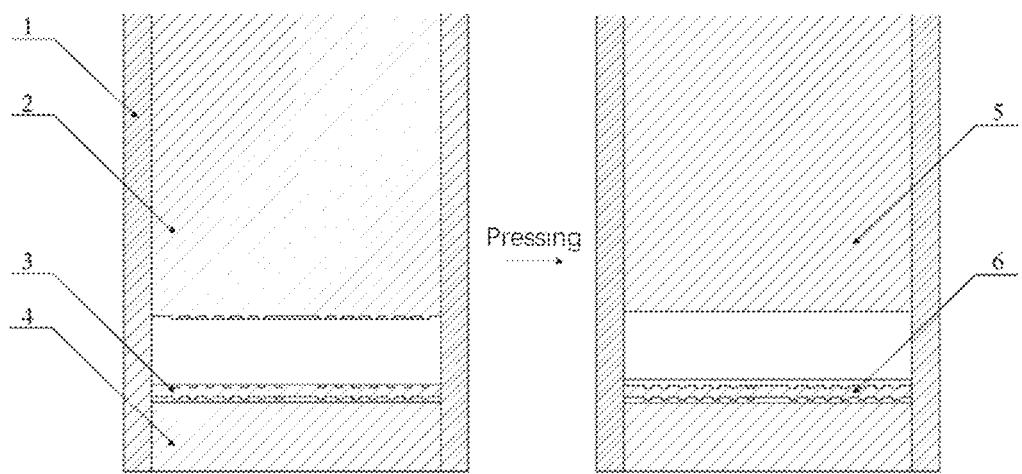
FIG. 1 is a schematic diagram of the present invention during a cold briquetting.
Figures 2A, 2B:
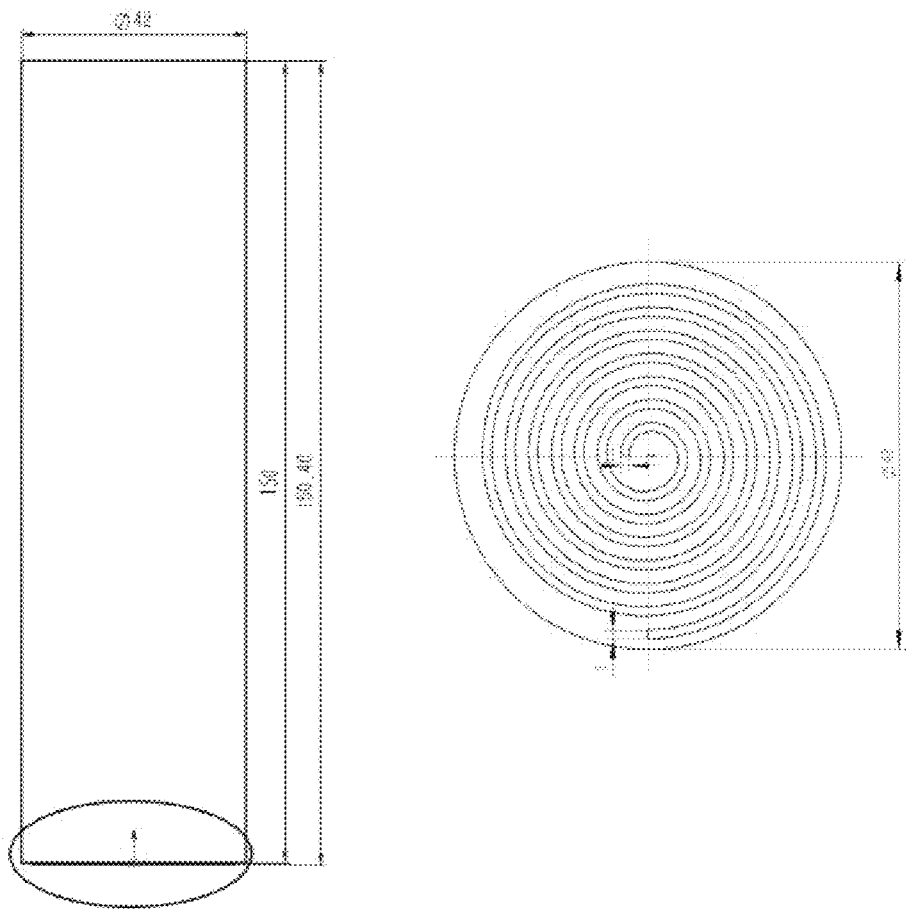
FIGS. 2(*a*) and 2(*b*) are schematic diagrams of a graphite indenter with a spiral linear bulge on a working surface thereof used in the present invention.
Figure 6:
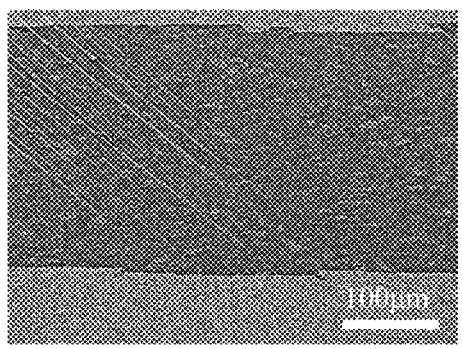
FIG. 6 is an SEM photograph of an interface morphology of a shell-bionic ceramic tool.
Figure 7:
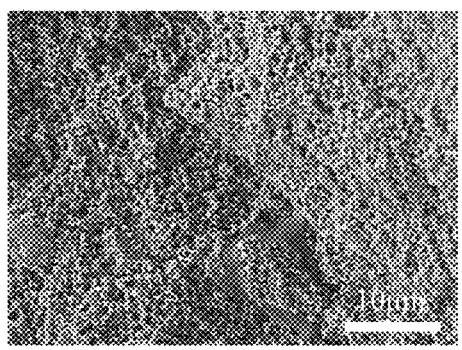
FIG. 7 is an SEM photograph of a fracture morphology at the interface of the shell-bionic ceramic tool.
Figure 8:
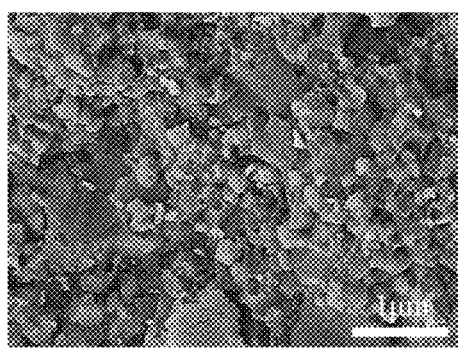
FIG. 8 is an SEM photograph of the fracture morphology of a matrix layer of the shell-bionic ceramic tool.
Figure 9:
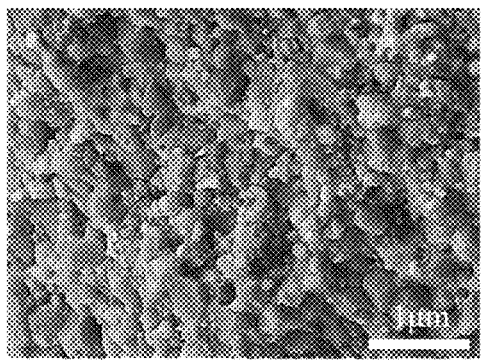
FIG. 9 is an SEM photograph of the fracture morphology of an interlayer of the shell-bionic ceramic tool.

In a typical embodiment of the present invention, for preparing the shell-bionic ceramic tool, the present example adopts a method described as follows, wherein a graphite sleeve, a graphite bedding block, a graphite indenter, a graphite rod, etc. are used in the preparation process, as shown in FIGS. 1, 2 (a), 2 (b), 3 (a), 3 (b), 4 (a), and 4 (b);

In the present example, the preparation process of the shell-bionic ceramic tool is as follows:

(1) a matrix layer is composed of submicron $Al_2O_3$ as a substrate phase, (W, Ti)C as a reinforcing phase, MgO and $Y_2O_3$ as sintering aids, preparing a composite powder of submicron $Al_2O_3$, (W, Ti)C, MgO and $Y_2O_3$ with contents of (W, Ti)C, MgO and $Y_2O_3$ of 40 (vol %), 0.5 (vol %) and 0.5 (vol %), respectively; an interlayer is composed of submicron $Al_2O_3$ as the substrate phase, TiC as the reinforcing phase, Ni and Mo as metal phases, MgO and $Y_2O_3$ as the sintering aids, and preparing a composite powder of submicron $Al_2O_3$, TiC, Ni, Mo, MgO, and $Y_2O_3$ with contents of TiC, Ni, Mo, MgO and $Y_2O_3$ of 30 (vol %), 1.5 (vol %), 1.5 (vol %), 0.5 (vol %) and 0.5 (vol %), respectively;

(2) carrying out a high-speed ball-milling on prepared composite powder of submicron $Al_2O_3$, (W, Ti)C, MgO, and $Y_2O_3$ with anhydrous ethanol as a dispersion medium for 72 h; carrying out the high-speed ball-milling on prepared composite powder of submicron $Al_2O_3$, TiC, Ni, Mo, MgO, and $Y_2O_3$ with anhydrous ethanol as the dispersion medium for 72 h;

(3) placing the composite powder of submicron $Al_2O_3$, (W, Ti)C, MgO, and $Y_2O_3$ and the composite powder of submicron $Al_2O_3$, TiC, Ni, Mo, MgO, and $Y_2O_3$ after the ball-milling in a vacuum drying oven for drying, setting a drying temperature to 120° C., until the anhydrous ethanol in the composite powder is completely removed, and after drying, sieving the dried composite powder with a 100-mesh sieve, and packaging for standby;

(4) weighting and loading the prepared composite powder of submicron $Al_2O_3$, (W, Ti)C, MgO, and $Y_2O_3$ into a graphite sleeve with a lower part thereof closed by a graphite bedding block, then pre-pressing the composite powder using a graphite indenter as shown in FIG. 2, then loading the weighted composite powder of submicron $Al_2O_3$, TiC, Ni, Mo, MgO, and $Y_2O_3$, pre-pressing the composite powder using the graphite indenter as shown in FIG. 4, then loading the weighted composite powder of submicron $Al_2O_3$, (W, Ti)C, MgO, and $Y_2O_3$ again, pressing by using a graphite rod, and then carrying out a cold briquetting on a press with a pressure of 1 t;

(5) after the cold briquetting is completed, removing the graphite rod, and inserting the graphite bedding block on a top of a ceramic green body and compacting, and then sealing the graphite sleeve with the graphite rod and placing the whole in a hot-pressed sintering furnace for sintering and densification, with a sintering temperature of 1650° C., a holding time of 25 min and a sintering pressure of 32 MPa; and (6) after the sintering is completed and being cooled to room temperature, taking out the sample obtained by sintering, carrying out processes such as grinding, polishing, and cutting on the sample to complete the preparation of the shell-bionic ceramic tool, and an interface of the prepared shell-bionic ceramic tool is shown in FIG. 6. From FIGS. 6 to 9, it can be seen that the interface of the prepared shell-bionic ceramic tool is tightly bonded, with less porosity, high densities and tightly bonded grains, and mechanical properties thereof are as follows: a Vickers hardness is 20.40±0.10 GPa, a fracture toughness is 7.00±0.15 MPa·m$^{1/2}$, and a bending strength is 981.51±10.29 MPa.

Figure 3A:
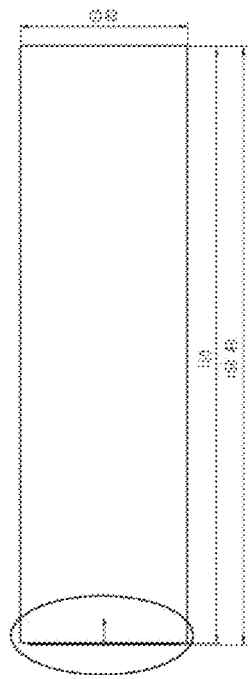
FIGS. 3(*a*) and 3(*b*) are schematic diagrams of a graphite indenter with multiple concentric circular bulges on the working surface thereof used in the present invention.
Figure 3B:
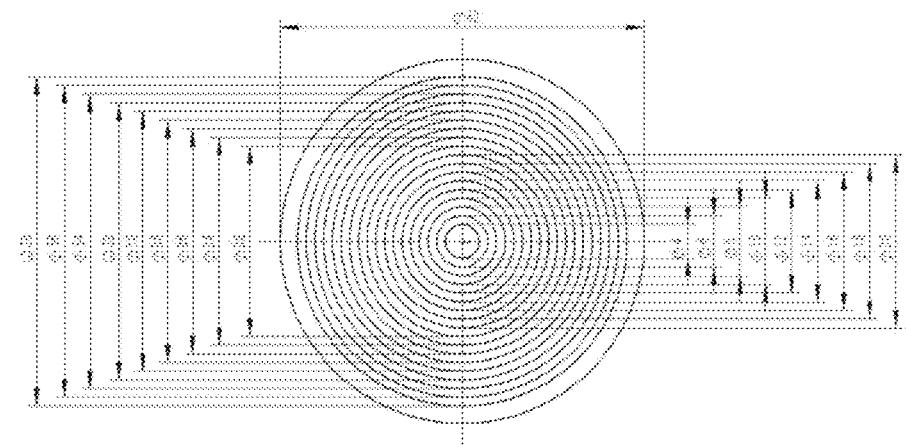
Figure 4A:
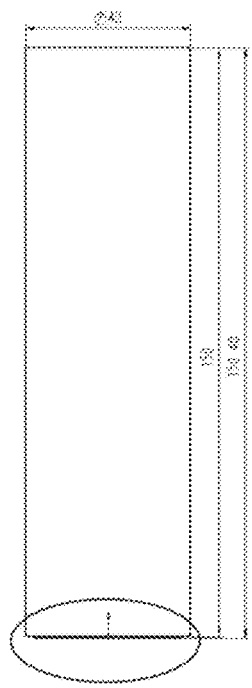
FIGS. 4(*a*) and 4(*b*) are schematic diagrams of the graphite indenter with multiple concentric circular bulges on the working surface thereof used in the present invention.
Figure 4B:
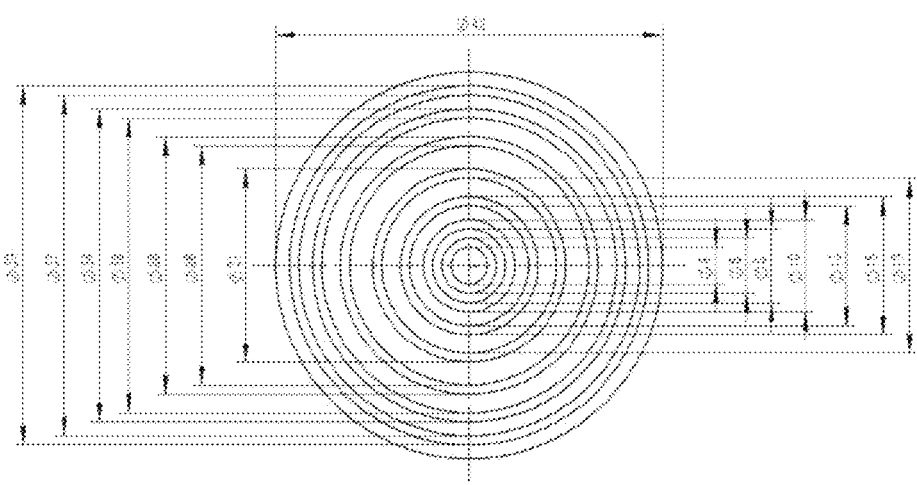
Figure 5:
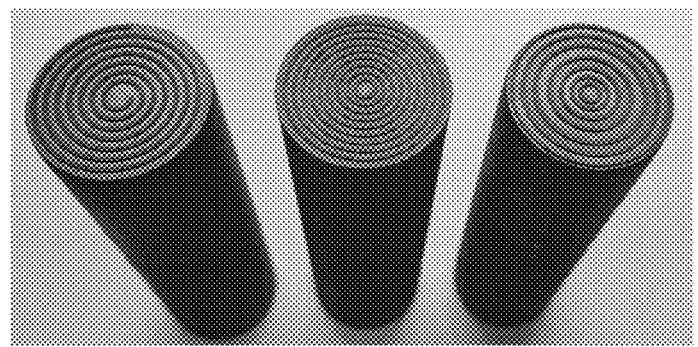
FIG. 5 is a physical view of the graphite indenter with complex shape used in the present invention.

In the above steps, the shapes and the related dimensions of the graphite indenter used are shown in FIGS. 2 (a), 2 (b), 3 (a), 3 (b), 4 (a) and 4 (b), wherein the bulges on the working surface of the graphite indenter shown in FIGS. 2 (a) and 2 (b) are spiral curves from the inner ring to the outer ring in one circle; the bulges on the working surface of the graphite indenter shown in FIGS. 3 (a) and 3 (b) are a number of concentric rings of bulges; and the bulges on the working surface of the graphite indenter shown in FIGS. 4(a) and 4(b) are a number of concentric rings of bulges. The difference between FIGS. 3(a) and 3(b) and FIGS. 4(a) and 4(b) is that the size of the concentric rings of bulges is different. The working surface of the indenter die used in the present example is basically symmetrical, and the working surface is more complex, so that the layers of the prepared material bite each other, simulating the structure of mineral bridges in the shell nacre, and diffusion and penetration occur at the interface bonding, which increases the interface bonding strength. There is no need to consider the using direction of the working surface during the molding and sample processing, which reduces the difficulty of preparing the shell-bionic ceramic tool. It not only improves the mechanical properties of the material, but also ensures the uniformity of the mechanical properties of the material and avoids anisotropy of the mechanical properties in the direction perpendicular to the stacked layers. Through the actual mechanical property test, the mechanical properties of the material are evenly distributed, and there is no anisotropy in the direction perpendicular to the lamination. Due to the introduction of the uneven interfaces, the bonding area of the layers is further increased, and a certain degree of diffusion and penetration occurred at the interface bonding, which improved the strength of the material, and the mechanisms of crack deflection, bifurcation, bridging and interfacial debonding appeared at fracture promoted the improvement of the fracture toughness of the material. In addition, the microstructure of the ceramic tool can be adjusted during the preparation process to achieve controllable mechanical properties.

A main feature of the ceramic tool is that it has a layered structure. During the preparation process, each layer of the ceramic powder is loaded, the graphite indenter with a complex shape is used for pre-pressing, so that the interface between layers has a complex shape, increases the bonding area between layers, and plays a role of hindering crack expansion, extending the crack expansion path, and improving the bonding strength of the interface. In addition, the hot-pressed sintering is used to densify the ceramic green body, so the ceramic tools prepared thereby have high density, uniform grain size and tight interface bonding, which improve the mechanical properties and working reliability of the ceramic tools.

The present invention adopts the preparation method combining the cold briquetting and the hot-pressed sintering, which has the advantages of simple operation, low cost, controllable mechanical properties, and fast preparation, etc.

It should be noted that although the interface shape of each layer in the above example is the same, it is not limited to this one interface shape, and different interface shapes can be applied using the graphite indenter shown in FIGS. 2 (a), 2 (b), 3 (a), 3 (b), 4 (a), and 4 (b), and the graphite indenter of different shapes can be used in combination, depending on the actual design for preparation.

The above description is only the preferred example of the present invention, and is not intended to limit the present invention. For those skilled in the art, the invention can have various changes and variations. Any modification, equivalent replacement and improvement within the spirit and principle of the present invention shall be included in the protection scope of the present invention.

What is claimed is:

1. A method for preparing a shell-bionic ceramic tool, the shell-bionic ceramic tool comprises alternating layers of ceramic powder with different components, the method further comprising: performing a cold briquetting, during said cold briquetting, carrying out pre-pressing once using a graphite indenter with a spiral linear bulge or multiple concentric circular bulges on a working surface thereof after each layer of the ceramic powder being loaded, and pressing a last layer using a graphite rod, and then pressing a whole ceramic green body with a certain pressure to promote a bonding of the layers of ceramic powder, which in turn gives a complex shape to an interface between the layer;
wherein, the ceramic powders with different components are as follows:
the ceramic powder of a matrix layer of the layers comprising a composite powder composed of submicron $Al_2O_3$, (W, Ti) C, MgO, and $Y_2O_3$, and the ceramic powder of an interlayer of the layers comprising a composite powder composed of submicron $Al_2O_3$, TiC, Ni, Mo, MgO, and $Y_2O_3$.

2. The method for preparing the shell-bionic ceramic tool according to claim 1, wherein a method for preparing the ceramic powder of the matrix layer is as follows:
carrying out a high-speed ball-milling on the composite powder of the submicron $Al_2O_3$, (W, Ti) C, MgO, and $Y_2O_3$ after being weighed with anhydrous ethanol as a dispersion medium, to make the composite powder be mixed uniformly; placing the composite powder of the submicron $Al_2O_3$, (W, Ti) C, MgO, and $Y_2O_3$ after the ball-milling in a vacuum drying oven for drying, and after the drying, sieving and packaging the dried composite powder for future use.

3. The method for preparing the shell-bionic ceramic tool according to claim 1, wherein a method for preparing the ceramic powder of the interlayer is as follows:
carrying out a high-speed ball-milling on the composite powder of the submicron $Al_2O_3$, TiC, Ni, Mo, MgO, and $Y_2O_3$ after being weighed with anhydrous ethanol as a dispersion medium, to make the composite powder be mixed uniformly; placing the composite powder after the ball-milling in a vacuum drying oven for drying, and after the drying, sieving and packaging the dried composite powder for future use.

4. The method for preparing the shell-bionic ceramic tool according to claim 1, wherein a process of the cold briquetting is as follows:
weighting and loading a prepared ceramic powder of a matrix layer of the layers into a graphite sleeve with a lower part thereof closed by a graphite bedding block, then performing the pre-pressing of the ceramic powder of the interlayer using the graphite indenter with the spiral linear bulge or multiple concentric circular bulges on the working surface thereof, then performing the loading of a prepared ceramic powder of an interlayer of the layers into the graphite sleeve, and then performing the pre-pressing of the ceramic powder of the interlayer using the graphite indenter with the spiral linear bulge or multiple concentric circular bulges on the working surface thereof, laying the ceramic powders of the matrix layer and the interlayer alternately in turn, and carrying out the pre-pressing using the graphite indenter with the spiral linear bulge or multiple concentric circular bulges on the working surface thereof after the loading of each of matrix layers and interlayers laid alternatively, and performing the pressing of the last layer using the graphite rod, and then the pressing of the ceramic green body in a whole with the certain pressure to promote the bonding of the layers of the ceramic powder, which in turn gives the complex shape to the interface between the layers.

5. The method for preparing the shell-bionic ceramic tool according to claim 4, wherein after the cold briquetting is completed, removing the graphite rod, and inserting another graphite bedding block on a top of the ceramic green body and compacting, and then sealing the graphite sleeve with the graphite rod and placing the whole in a hot-pressed sintering furnace for sintering and densification; after the sintering is completed and being cooled to room temperature, taking out a sample obtained after the sintering, carrying out processes comprising grinding, polishing and cutting on the sample to complete the preparation of the shell-bionic ceramic tool.

6. The method for preparing the shell-bionic ceramic tool according to claim 1, wherein, when making one ceramic tool, different layers of the ceramic powder layers may be compacted with graphite indenters with different working surfaces.

* * * * *